(No Model.)
G. H. THOMAS.
PIE TURNER.
No. 370,503. Patented Sept. 27, 1887.
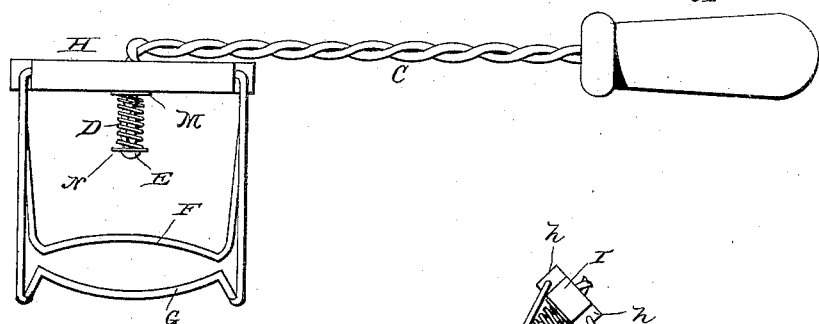
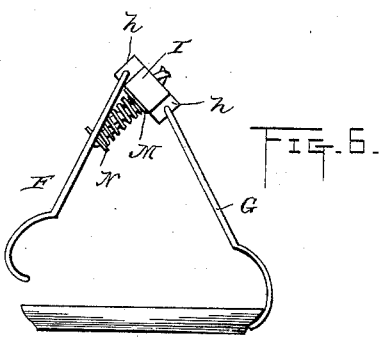
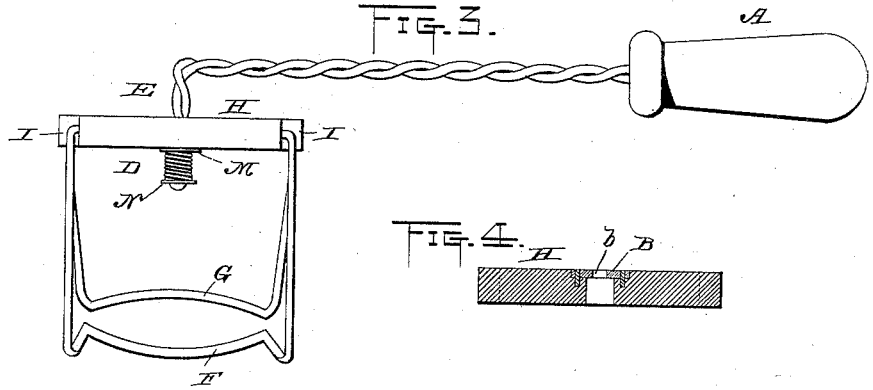
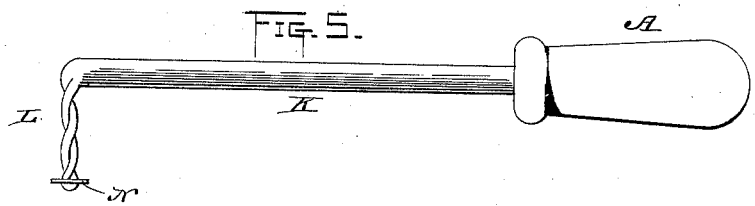
Witnesses
J. G. Connus Jr.
V. E. Hodges
Inventor
G. H. Thomas
Hawes & Chapman, Attys.
by Henry Colver, Asso. Atty.

UNITED STATES PATENT OFFICE.

GEORGE H. THOMAS, OF CHICOPEE FALLS, MASSACHUSETTS.

PIE-TURNER.

SPECIFICATION forming part of Letters Patent No. 370,503, dated September 27, 1887.

Application filed April 30, 1887. Serial No. 236,743. (No model.)

*To all whom it may concern:*

Be it known that I, GEORGE H. THOMAS, of Chicopee Falls, in the county of Hampden and Commonwealth of Massachusetts, have invented a new and useful Improvement in Pie-Turners, of which the following is a specification, reference being had to the accompanying drawings, forming part thereof.

My invention relates to devices for lifting and automatically turning a pie within the stove oven, so that the several portions thereof may be equally subjected to that portion of the oven where the heat is greatest, and has for its object to improve the construction of such devices with a view to increasing their effectiveness of operation.

To this end my invention consists in the pie-turner constructed as hereinafter described, and particularly pointed out in the claims.

Referring to the drawings, in which like letters designate like parts in the several figures, Figure 1 is a side elevation of the pie-turner, the parts thereof being in their normal position. Fig. 2 is a plan view of the bar which carries the plate-engaging arms. Fig. 3 is a view similar to that shown in Fig. 1, showing the position of the parts after a pie has been lifted and turned and before disengaging the device from the plate. Fig. 4 is a central longitudinal section of the bar shown in Fig. 2. Fig. 5 shows a slightly-modified form of one portion of my invention. Fig. 6 illustrates the operation of engaging the depending arms with the plate.

The letter A designates the handle, which is preferably made of wood, into the end of which is inserted the end of a horizontal rod, C, having at its outer end a vertical extension, E, said terms "horizontal" and "vertical" indicating substantially the relative positions of said parts when the device is in use and as shown in the drawings. The vertical portion E of the rod is provided with spiral grooves upon opposite sides thereof, for a purpose hereinafter described; and in order to secure such grooves in a simple and inexpensive manner I prefer to make the entire rod from two strands of stiff wire spirally twisted together, as shown in Figs. 1 and 3, which strands may then be soldered together, if desired, to increase the rigidity of the rod.

H designates a bar having a central orifice of greater diameter than that of rod C E, and having a countersunk depression in its upper side surrounding said orifice, as shown in Figs. 2 and 4. Within said countersunk depression is seated a plate, B, which is secured to the bar by screws, as shown, or in other suitable manner, said plate having a central opening, $b$, conforming in outline to the shape of the vertical portion E of the rod in cross-section, whereby the plate and its attached bar H are adapted to advance and recede upon the rod by an axial movement similar to the movement of a nut upon the threads of a screw.

D designates a spiral spring surrounding the rod, bearing at one end against the lower side of bar H through an interposed washer, M, and at the other end against a washer, N, secured to the end of the rod and serving to retain the bar and spring thereon, the function of said spring being to normally retain the bar in its highest position, as shown in Fig. 1. The spiral twist of the vertical portion E of the rod is so graduated that the bar H, in descending from its highest position (shown in Fig. 1) to its lowest position, (shown in Fig. 3,) and vice versa, will perform a half-revolution about the rod. The bar H at its ends is cut away vertically to form the shoulders $h$, leaving between them the projecting portions I.

F and G are the plate-engaging arms, preferably made from stiff wire, bent, as shown, between the ends to form fingers wherewith to lift and hold a plate, and bent inwardly at the ends to form journals which are seated so as to have free axial movement in bearings in the face of the shoulders $h$ of bar H, as shown, being retained therein by the tension of the wire itself, or in any suitable manner. The bearings in the face of the shoulders $h$ are located about midway between the top and bottom thereof, in order to permit the lower corner of the projections I to act as levers against the arms G H, as will be presently described.

In Fig. 5 I have shown a rod of which the vertical portion L only is grooved or twisted, the horizontal portion K being plain. In such a rod the grooved and plain portions may be integral with each other, or may be connected together in any suitable manner.

So far as the operation of the device is concerned, this form of rod can be employed equally as well as the one shown in Figs. 1 and 3; but, as hereinbefore stated, upon the ground of greater economy in their manufacture, I prefer to use the form first described.

The operation of the device thus constructed is as follows: It being desired to turn a pie within the oven, so that the heat of the latter will act equally upon both sides thereof, the turner is grasped by its handle A and inserted within the oven. A slight axial movement of the handle in either direction will cause one of the lower corners of the projecting portions I of the bar H to contact with the adjacent arm F or G, as shown in Fig. 6, and separate said arms from each other. The free arm is then engaged with one side of the plate by means of its inwardly-projecting finger, as shown in said Fig. 6, and the opposite arm is lowered and allowed to swing toward the plate by turning the handle A until its finger is in engagement with the opposite side of the plate. The pie can now be raised from the bottom of the oven, whereupon its weight, overcoming the stress of spring D, causes the bar H to descend upon the portion E of the rod from its highest to its lowest position, during which movement, as previously described, the bar, and consequently the pie carried thereby, performs a half-revolution. The pie is then replaced upon the bottom of the oven, a slight axial movement of the handle A disengaging the arms F G therefrom, when the spring D returns the bar H to its normal position again. When it is desired to remove a pie from the oven, the same operation takes place, except that, instead of replacing the pie upon the bottom of the oven after its turning movement, it is withdrawn and deposited wherever it may be desired.

It will be observed that the device automatically turns the pie within the oven, and that all danger of burning the hands or arms of the user is avoided.

By means of the shoulders $h$ and projecting portions I of bar H perfect control of either of the arms F G is afforded in a simple and inexpensive manner.

It is not essential that the opening $b$ in plate B should be of the exact conformation shown in order to impart an axial movement to the bar as it moves up and down upon the rod; but I prefer to make it as shown, as thereby the wall of said opening closely embraces the spirally-twisted wires and insures steadiness of movement to the bar.

The only function of spring D being to return the bar H to its normal position, said spring may be very light and is not liable to be broken or rapidly worn out.

It will be observed that the device constructed as described is simple and inexpensive, and yet effective in operation.

It is obvious that various modifications can be made in the details of construction without departing from the spirit of my invention.

Having thus fully described my invention, what I claim, and desire to secure by Letters Patent, is—

1. As an article of manufacture, a pie-turner comprising, in combination, a spirally-grooved rod, a bar having a central orifice conforming substantially to the shape of said rod in cross-section, whereby said bar is adapted to have both axial and progressive movement upon said rod, plate-engaging arms depending from said bar, and a spring located between said bar and the lower end of the rod for normally retaining the bar in its highest position, arranged and operating substantially as set forth.

2. As an article of manufacture, a pie-turner comprising, in combination, a rod composed of two strands of wire spirally twisted together, a bar having a central orifice partially embracing said strands, a washer rigidly secured to the end of said rod, a spiral spring surrounding the rod and bearing at one end against said washer and at the other against the bar, and pivoted plate-engaging arms depending from said bar, arranged and operating substantially in the manner described.

3. As an article of manufacture, a pie-turner composed of the spirally-grooved rod C, having the vertical portion E at one end and handle A at the other, bar H, having a central orifice closely engaging the portion E of the rod, and having the shoulders $h$ and projecting ends I, arms F G, pivoted in bearings in the face of said shoulders $h$, spring D, and washer N, combined and operating substantially as shown and described.

4. In a pie-turner, the combination, with the rod C E, composed of two strands of wire spirally twisted together, of the bar H, having a central orifice of greater diameter than said rod, and having seated within a countersunk depression in its upper side surrounding said orifice the plate B, said plate having a central opening adapted to closely engage said rod, spring D, and washer N, substantially as set forth.

5. In a pie-turner, as a means for separating the plate-engaging arms thereof, bar H, having at each end the shoulders $h$ and central projection, I, arms F G, having between their ends the plate-engaging fingers, as shown, and having their ends seated within bearings in the face of shoulders $h$ of the bar H about midway between the top and bottom thereof, and means for supporting and laterally tilting said bar, combined and operating substantially as shown and described.

GEORGE H. THOMAS.

Witnesses:
W. H. CHAPMAN,
T. M. BROWN.